United States Patent [19]

Bolie

[11] 3,732,366

[45] May 8, 1973

[54] VIDEO PATTERN RECOGNITION SYSTEM

[76] Inventor: Victor W. Bolie, c/o Oklahoma State University School of Electrical Engineering, Stillwater, Okla. 74074

[22] Filed: Aug. 13, 1971

[21] Appl. No.: 171,547

[52] U.S. Cl........178/6.8, 178/DIG. 33, 178/DIG. 37, 340/146.3 AH

[51] Int. Cl...........G06k 9/08, G06k 9/12, H04n 7/18

[58] Field of Search........................178/6.8, DIG. 33, 178/DIG. 37; 340/146.3 AH

[56] References Cited

UNITED STATES PATENTS

| | | | |
|---|---|---|---|
| 3,593,286 | 7/1971 | Altman | 178/6.8 |
| 3,610,822 | 10/1971 | Ingham et al. | 178/6.8 |
| 3,598,907 | 8/1971 | Drinkuth | 178/DIG. 37 |
| 3,627,918 | 12/1971 | Redpath | 178/6.8 |
| 3,643,018 | 2/1972 | Adler | 178/6.8 |
| 3,476,197 | 11/1969 | Penix et al. | 178/DIG. 37 |

*Primary Examiner*—Howard W. Britton
*Attorney*—James R. Head et al.

[57] ABSTRACT

This invention comprises a video camera and a video tape carrying previously recorded video patterns, and means for comparing the camera-generated signal pattern with the played-back tape recorded signal pattern to see whether they are similar. The sweep signals of the camera are slaved to the playback device so that the sweeps are synchronous. The brightness signals are continuously compared and an average judgment made of the similarities of the two patterns.

Means are provided to normalize the pattern generated by the camera as regards size, angular position and position in the field of view.

Two principal applications of this system are described. These are:

a. Searching a pre-recorded file of patterns on video tape for frames which are similar to a pattern exposed to the camera, and
b. Comparing a current pattern of a field of view with a pattern recorded at a previous time of the same field of view, to indicate changes in the camera-produced pattern.

14 Claims, 11 Drawing Figures

INVENTOR.
VICTOR W. BOLIE
BY
Head & Johnson
ATTORNEYS

INVENTOR.
VICTOR W. BOLIE

BY Head & Johnson

ATTORNEYS

INVENTOR
VICTOR W. BOLIE
BY
Head & Johnson
ATTORNEYS

INVENTOR
VICTOR W. BOLIE
BY Head & Johnson
ATTORNEYS

INVENTOR.
VICTOR W. BOLIE
BY
Head & Johnson
ATTORNEYS

VIDEO PATTERN RECOGNITION SYSTEM

BACKGROUND OF THE INVENTION

1. Field of the Invention.

This invention relates in general to the subject of automatic recognition of optical images, and is related in particular to the electronic processing and the automatic perception of images represented in the electrical form of conventional television images. Still more particularly it is concerned with the comparison of two electronic images where one is derived from a previously recorded video tape and the other is received from a video camera.

2. Description of the Prior Art.

Previous image-identification systems have been too complex and bulky in size, and too intolerance of other than rigidly restricted input formats, to permit their effective use in situations requiring compactness and portability of equipment, simplicity of operations, and substantial flexibility with respect to inputs. The new technique presented herein are designed to overcome these major problems.

These limitations of the prior art are overcome, and the objects of this invention listed below are achieved in a system in which a playback video recorder is used to (a) generate a horizontal ($h$) and vertical ($v$) sweep signal, and (b) a brightness ($z$) signal read from the tape. A camera utilizes these sweep signals ($h,v$) to scan its image and to provide its recorded brightness signal ($z^1$). The waveform agreement detector, which is the heart of this system, utilizes the two brightness signals to make a comparison of the two patterns. The waveform agreement detector (WAD) may have included a centripetal enhancement circuit which directs the W.A.D. to pay most attention to the central portion of the pattern, and less attention to the extremities of the pattern. In case the two patterns being compared are not of substantially the same size, position and tilt, the WAD may have a video image normalizer in the camera circuit.

Two applications of this recognition system are described. In one, the playback of a previously recorded videotape provides consecutive images which are compared to the image to which the camera is exposed. In the other, the WAD has one pattern derived from a camera exposed to a field of view, while the other pattern is derived from a video tape recorded by that same camera at a selected time previous to the comparison.

A first object of this invention is to provide a video image recognition system which utilizes input and reference video signals such as those generated by conventional television camera and recording equipment.

A second object of this invention is to provide a waveform-agreement detector which measures the degree of similarity between two voltage waveforms such as the two video signals generated by a pair of scan-synchronized television cameras.

A third object of this invention is to provide a centripetal enhancement means which desensitizes the peripheries of the input and reference images for optimum video pattern recognition.

A fourth object of this invention is to provide a video image normalizer capable of automatically standardizing any televisable optical image with respect to translation, rotation, and size.

A fifth object of this invention is to show the design of an electronic change-of-scene detector which will automatically detect whether or not an appreciable change in a visible scene has occurred.

These and other objects and advantages and a full understanding of this invention will become apparent from the following description taken in conjunction with the appended drawings, in which.

Figure 1:
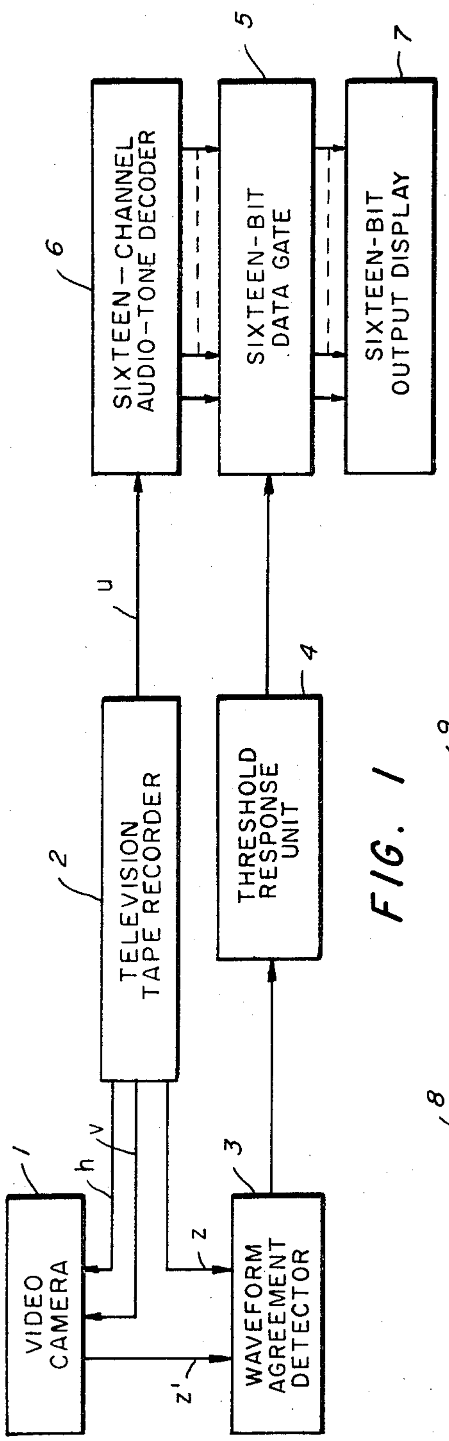
FIG. 1 shows in schematic form one embodiment of this invention comprising a video image recognition system utilizing a television camera and tape recorder.

Turning now to the drawings and in particular to FIG. 1, it is seen that the illustrated video image recognition system is comprised of a television camera 1, a television tape recorder 2, a waveform-agreement detector 3, a threshold response unit 4, a 16-bit data gate 5, a 16-channel audio tone decoder 6, and a 16-bit output display 7. The camera 1 may be any one of several commercially available types such as the Model 1 AVC-3200-DX Video Camera manufactured by the Sony Corporation of America at Long Island City, N.Y. This type of camera has the capability of scanning its optical input image in accord with a standard 30 Hz interlaced 525-line format, with both the 60 Hz alternating-vertical-field sweep and the 15,750 Hz horizontal-sweep being electively synchronizable with externally supplied 60 Hz and 15,750 Hz sync pulses. The television tape recorder 2, which is assumed to be compatible with the camera 1, may be any one of several commercially available types such as the Sony Model AV-3600 Videocorder, provided that a simple modification is made. The modification is simply that of externalizing the horizontal and vertical sync signals, so that when the recorder 2 is operated in the playback mode it will make available to the camera 1 the same type of 60 Hz and 15,750 Hz sync pulses ($h$, $v$) as those internally isolated and used in a standard image viewing monitor such as the Sony Model CVM-110U.

It is assumed that prior to operation of the system of FIG. 1 as a video image recognition system the recorder 2 is preloaded with a half-hour tape cartridge which magnetically contains up to 30 × (3600/2) = 54,000 individual video images, each accompanied by an identifying 16-bit binary number represented in electrical form by a 16-tone audio signal recorded on the sound track of the tape. The preloading procedure can be accomplished by use of any one of several techniques which are well known in the magnetic recording art. For example, the composite audio signal can be presented to the audio recording input through a 16-input summing amplifier having each of its audio-tone inputs gated in accord with the state of a 16-bit binary counter; a 30 Hz counter-stepping pulse-train is readily obtained from a pick-off which senses the angular revolutions of the video sensing-head shaft. Thus, as is well known in the art, by means of conventional video gating techniques, any desired video image can be recorded in correspondence with the binary number recorded in the audio channel.

With the tape cartridge prepared as described above, and with the recorder 2 supplying the horizontal and vertical sync pulses $h$ and $v$ to the camera 1 while operating in the playback mode, the remaining functions of the video image recognition system of FIG. 1 may be described. The waveform agreement detector 3 receives the video output signal (V.O.S.) voltage (brightness signal) $z$ from the recorder 2 and the video output signal voltage $z'$ from the camera 1, and produces an appreciable output voltage which is large if, and only if, $z$ remains nearly equal to $z'$ over a substantial time interval. The output voltage of the waveform agreement detector 3 is used as the input signal to the threshold response unit 4, the output of which is used as the control signal for the 16-bit data gate 5. Thus, if the video output signal $z$ and $z'$ from the recorder 2 and camera 1 are in substantial agreement over an appreciable time interval, the waveform agreement detector 3 will have a substantial output, thereby triggering the threshold response unit 4 to activate the sixteen-bit data gate 5. The activated 16-bit data gate 5 permits the 16 outputs of the audio-tone decoder 6 to be transmitted as inputs to the 16-bit output display 7.

The 16-bit data gate 5, as well as the 16-channel audio-tone decoder 6, may be of the conventional types which are well known in the information-processing arts. The output display 7 may be considered to be a simple panel of 16 lamps for the purposes of this discussion.

Since the audio-tone decoder 6 receives its composite audio signal voltage u from the audio channel of the recorder 2, and since the binary number represented by the composite audio tone is a unique identification of the video image being retrieved from the recorder 2, any binary number illuminated by the lamps of the output display 7 will be an identification of the optical image being scanned by the camera 1. The electrical information associated with the output display 7 may, of course, be used for any other desired purposes.

Figure 2:
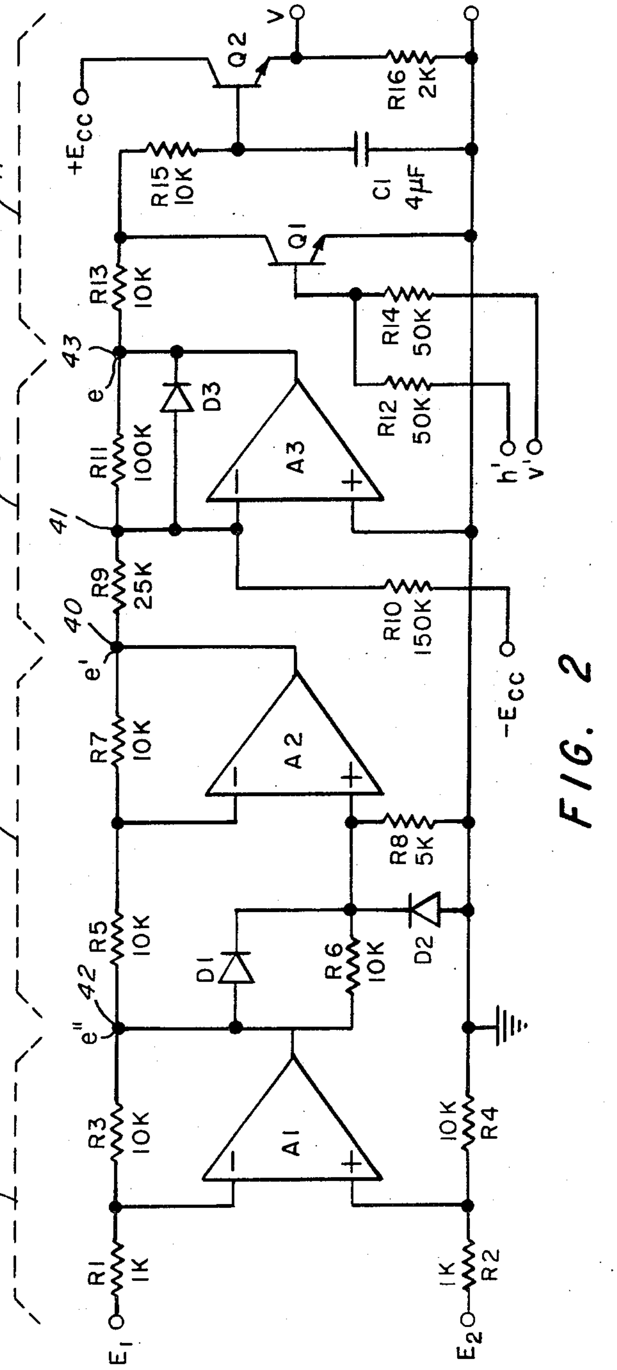
FIG. 2 illustrates the structure of a waveform-agreement detector suitable for use as a component of the video image recognition system of FIG. 1.
Figure 3A:
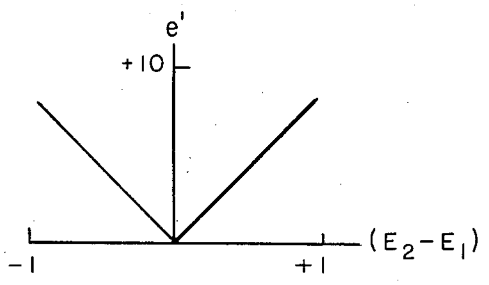
FIGS. 3A and 3B show in graphical form the performance characteristics of the waveform-agreement detector of FIG. 2.

Turning next to FIG. 2, it is seen that the waveform agreement detector is a special circuit comprised of the four sections 8, 9, 10, and 11 connected in series. The first section 8 is a voltage difference amplifier, consisting of the operational amplifier A1 and its associated resistances R1, R2, R3, and R4. The values of the passive components are chosen so as to relate the output voltage $e''$ of the first section 8 at terminal 42 to the video input voltages $E_1 = z$ and $E_2 = z'$ by the equation $e'' = 10(E_2 - E_1)$. The second section 9 is a fullwave unity-gain rectifier, consisting of the amplifier A2, the diodes D1 and D2, and the four resistances R5, R6, R7, and R8. Thus, the output voltage $e'$ of the second section 9 at terminal 40 is related to the input and output voltages of the first section 8 by the formula $e' = |e''| = 10 \cdot |E_2 - E_1|$, which is illustrated graphically in FIG. 3A.

Figure 3B:
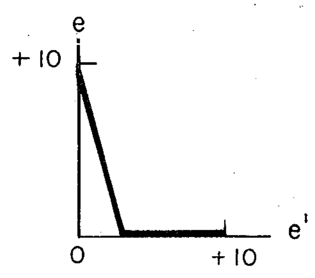

The third section 10 of the waveform agreement detector of FIG. 2 is a modified summing amplifier, consisting of the amplifier A3, the diode D3, and the resistances R9, R10, and R11. The values of the resistances R9, R10, and R11 are chosen so that, with the diode D3 arranged as shown, the output voltage $e$ of the amplifier A3 is essentially zero when the output voltage $e'$ of the second section 9 is greater than $(E_{cc}/6)$, and is otherwise determined by the formula $e = (2E_{cc}/3) - 4e'$, in which typically $E_{cc} = 15$ volts. This relationship of the output voltage $e$ of the third section 10 at terminal 43 to the output voltage $e'$ of the second section 9 is illustrated graphically in FIG. 3B.

The fourth section 11 of the waveform agreement detector of FIG. 2 is comprised of the capacitance C1, the two NPN transistors Q1 and Q2, and the five resistances R12, R13, R14, R15, and R16. The capacitance C1 and the two series-connected resistances R13 and R15 are arranged to form a simple RC-integrator having the input voltage $e$, and having a time constant at least as large as the 33-millisecond time interval required for the camera 1 to scan a given input image. The transistor Q2 and the resistance R16 form a load-isolating emitter follower which at all times maintains the output voltage V essentially equal to the voltage across the capacitance C1. The transistor Q1 has its emitter grounded, its collector connected to the R13-R15 node, and its base connected through the separate resistances R12 and R14 to the gating input terminals $h'$ and $v'$. The horizontal and vertical sync-pulse trains $h$ and $v$ available from the recorder 2 of FIG. 1 are applied to the gating input terminals $h'$ and $v'$ in order to cancel the residual error in the output voltage V attributable to the unavoidable agreement between the two input voltages $E_1$ and $E_2$ over the finite durations of their inherent horizontal and vertical sync pulses. In some applications this residual-error cancellation may not be necessary, in which case the gating input terminals $h'$ and $v'$ may be left unconnected. In other applications it may be desirable to excite the gating input terminals $h'$ and $v'$ with reconstructed horizontal and vertical blanking pulses, which, in the conventional video signal, span somewhat longer fractions of the 15,750 Hz and 60 Hz periods than do the horizontal and vertical sync pulses.

Thus, the desired operational characteristics of the waveform-agreement detector 3 are seen to be realized by the special circuit of FIG. 2. It will also be seen that the detection sensitivity can be increased or decreased by decreasing or increasing the resistance R9 which couples the second and third sections 9 and 10. By replacing the resistance R9 with an electronically variable conductance, the effective sensitivity of the waveform-agreement detector 3 may be varied as desired within the 33-msec time lapse of a single pair of coordinated scans of the input image sensed by the camera and the reference image retrieved by the recorder. When emphasis of the central areas of the various video images is desired, the resistance R9 may be replaced by the centripetal enhancement circuit of this invention.

Figure 4A:
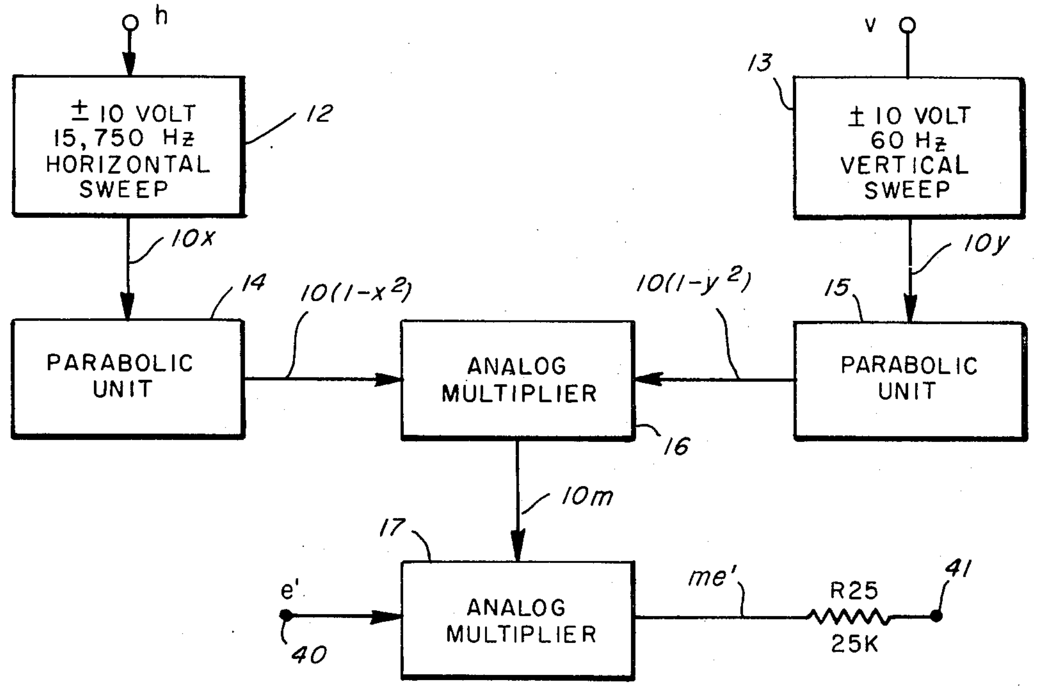
FIGS. 4A and 4B illustrate the structure and performance of a centripetal enhancement means which emphasizes the central areas of the input and reference images to be compared in the circuit of FIG. 1.

Turning next to FIG. 4A, it is seen that the centripetal enhancement circuit is comprised of a horizontal sweep generator 12, a vertical sweep generator 13, two parabolic units 14 and 15, two analog multipliers 16 and 17, and the output resistance R25. The circuit of FIG. 4A is drawn and labelled so as to be essentially self-explanatory. It is apparent from the indicated functional description of each component that the novelty of the design is in the overall agreement and interconnections of the various components, rather than in their easily foreseen individual structures. Thus, the horizontal and vertical sweep generators 12 and 13 may be simple ±10 volt sawtooth oscillators having, respectively, the sweep frequencies of 15,750 Hz and 60Hz when synchronized by application of the input pulse trains $h$ and $v$ available from the recorder 2. Similarly, the two parabolic units 14 and 15 may each consist simply of a voltage squaring unit connected in series with a voltage summing device which has the remaining one of its two inputs connected to a constant-voltage source. Thus, with $-1 \leq X \leq +1$, and with $10x$ being the sawtooth output voltage of the horizontal sweep generator 12, the series-connected first parabolic unit 14 produces the output voltage $10\cdot(1-x^2)$. Likewise, with $-1 \leq y \leq +1$, and with $10y$ being the sawtooth output voltage of the vertical sweep generator 13, the series-connected second parabolic unit 15 produces the output voltage $10\cdot(1-y^2)$.

Figure 4B:
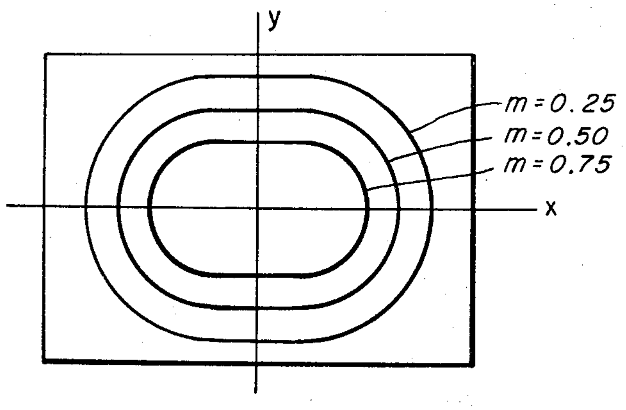

Referring still to FIG. 4 in general, the two analog multipliers 16 and 17 may be of a conventional type such as that manufactured by the Burr-Brown Research Corporation of Tuscon, Arizona. With its two input signals being respectively the output voltages of the two parabolic units 14 and 15, the first analog multiplier 16 produces the output voltage $10m$, where $m = (1-x^2)\cdot(1-y^2)$. The second analog multiplier 17 has the voltage $10m$ applied to one of its input terminals, and is excited at the other of its input terminals by the output voltage $e'$ of the second section 9 of the waveform-agreement detector 3. Consequently, the second analog multiplier 17 produces the output voltage $m\cdot e'$, in which the multiplication coefficient $m$ decreases from an image-center value of $m = 1.0$ at $x\,y\,y = 0$ to an image-periphery value of $m = 0$ at $x = y = 1$ as illustrated graphically in FIG. 4B. The output terminal of the circuit of FIG. 4A is connected to the output terminal of the multiplier 17 through the resistance R25, which has a typical value of 25 kilohms. Thus, the centripetal enhancement circuit of FIG. 4A has the open-circuit output voltage $(1-x^2)\cdot(1-y^2)\cdot e'$, and when this entire circuit is used to replace the resistance R9 in the circuit of FIG. 2, the output voltage V of the waveform-agreement detector 3 is made to be more sensitive to the central areas and less sensitive to the distal areas of both the input image sensed by the camera 1 and the reference image retrieved by the recorder 2. In operation, the terminals 40, 41 are inserted into the circuit of FIG. 2 at the correspondingly numbered terminals, and resistor R9 is removed.

With respect to the video pattern recognition system of FIG. 1, it will be seen that various redundancies in the stored reference patterns can be minimized, and that greater accuracy in recognition performance can be realized, if each input image and each reference image has a standard size, a standard centroid position, and a standard major-axis alignment. A novel way of achieving this geometric standardization, of each of the preloaded reference patterns as well as of each of the subsequent input images, is to make use of specialized electronic feedback circuits to control the position, inclination, and size of the rectangular scanning window formed by the 15,750 Hz and 60 Hz sweep deflection signals in the conventional television camera. A television camera thus modified, which may optionally replace the aforementioned camera 1, will hereinafter be referred to as a video image normalizer, the description of which is a part of this invention.

Figure 5:
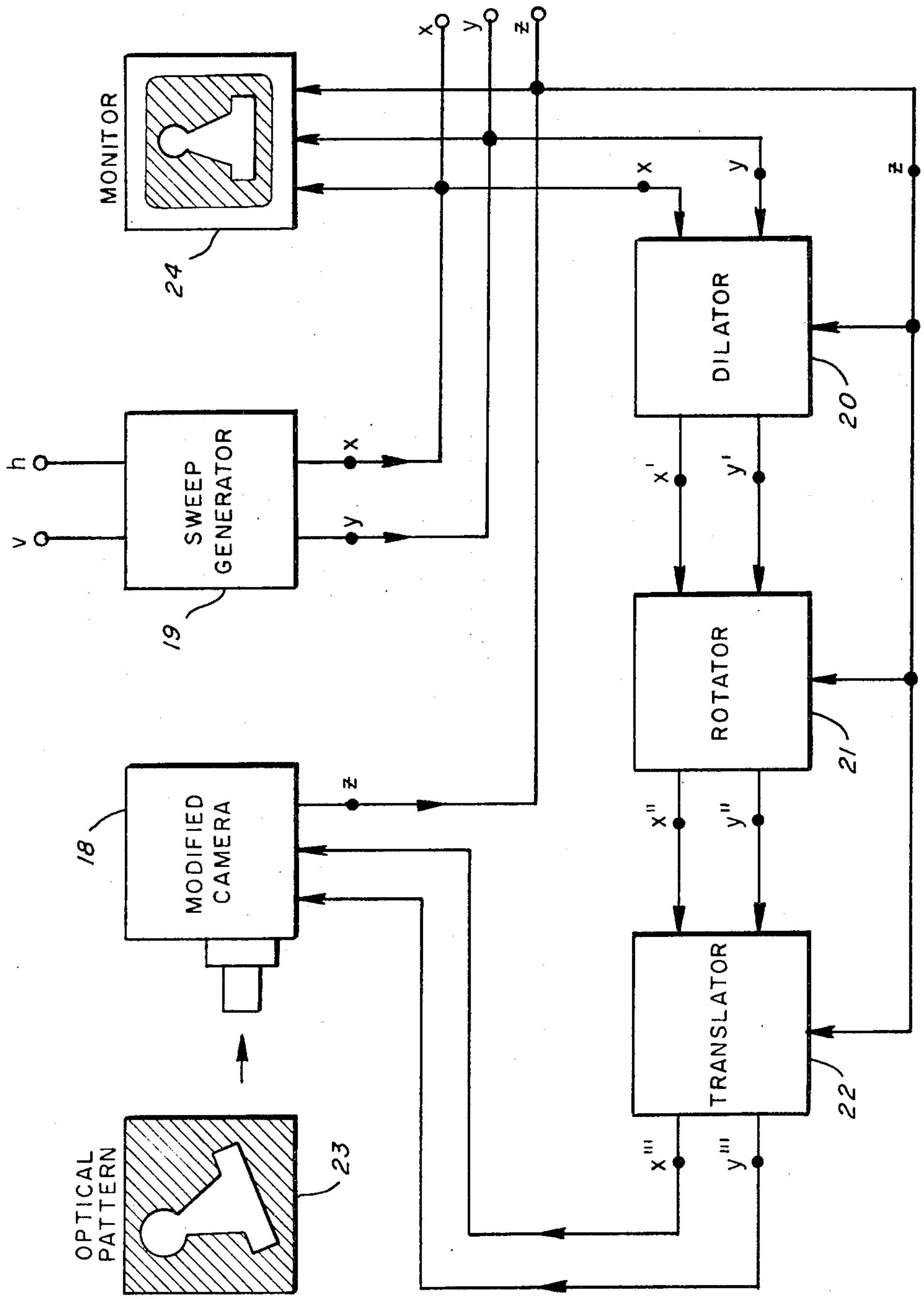
FIG. 5 shows a video system which utilizes a video image normalizer, with its several subsystems identified in block form.

Turning now to FIG. 5, is is seen that the video image normalizer is comprised essentially of a modified television camera 18, a sweep generator 19, a dilator 20, a rotator 21, and a translator 22. Additionally, an optical input pattern 23 and a video output monitor 24 are shown in order to clarify the description of the normalizer operation. For the purposes of this discussion the monitor 24 is assumed to be a cathode-ray-tube oscilloscope which responds in the conventional manner to the horizontal deflection voltage $x$, the vertical deflection voltage $y$, and the video intensity voltage $z$. The modified camera 18 is similar to a conventional television camera except that the instantaneous position of its scanning spot is arranged to be controlled by the substituted 15,750 Hz and 60 Hz horizontal and vertical sweep voltages $x'''$ and $y'''$ produced by the translator 22. Further, it will be assumed that the internal horizontal and vertical deflection scale-factors in the camera 18 are set somewhat below their normal values so as to make the usable focal plane area in the camera 18 approximately twice as wide and twice as high as the area actually covered by the superimposed rectangular scanning window.

In the video image normalizer of FIG. 5, a dual-sweep generator 19 of conventional design receives standard horizontal and vertical sync-pulse inputs $h$ and $v$, and produces the 15,750 Hz sawtooth output voltage $-V_m \leq X \leq V_m$, as well as the 60 Hz sawtooth output voltage $-V_m \leq v \leq +V_m$, in which $V_m$ has the typical value of $V_m = 10$ volts. The $x$ and $y$ sawtooth waveforms are interrelated by means of the conventional horizontal and vertical input sync pulses $h$ and $v$ so that they produce a standard rectangular 525-line interlaced scanning raster. The camera 18 produces the video output voltage $z$ which varies within the range $0 \leq z \leq V_m$, in which it will be assumed that $z = 0$ is the black level, and $z = V_m$ is the white level. The three voltages $x$, $y$, and $z$ comprise the output signals of the video image normalizer. The video output voltage $z$ is also used as a control-signal input to the dilator 20, the rotator 21, and the translator 22. The horizontal and vertical sawtooth deflection voltages $x$ and $y$ are further used as signal inputs to the dilator 20, which produces two magnified output deflection voltages $x'$ and $y'$. The rotator 21 converts its two input signals $x'$ and $y'$ into two orthogonally-rotated output deflection voltages $x''$ and $y''$ and the translator 22 converts its two input signals $x''$ and $y''$ into the two DC-biased output deflection voltages $x'''$ and $y'''$.

The dilator 20 in the video image normalizer of FIG. 5 has the specific function of making use of its control-signal input voltage $z$ to convert the two input deflection voltages $x$ and $y$ into two corresponding output deflection voltages $x'$ and $y'$, in accord with the relations $$x' = m \cdot x \quad (1)$$

$$y' = m \cdot y \quad (2)$$

in which $m$ is a dimensionless magnification factor which rather slowly increases or decreases in accord with the differential equation $$dm/dt = \overline{z \cdot (x^2 + y^2 - b^2)} / (\tau V_m^3) \quad (3)$$

In the latter expression the fixed voltage $b$ is preset in accord with the desired size of the image displayed by the monitor 24, and typically has a value of $b = 2.5$ volts when the desired radius of gyration of the video image is equal to one-fourth of the mean diameter of the monitor viewing screen. The super-bar in equation (3) denotes the running time-averaging function of a simple low-pass filter having a bandwidth B which is small when compared to the 30 Hz repetition rate of the conventional video image and which has a typical value of $B = 5$ Hz. The time constant $\tau$ is typically chosen to have a value of $\tau = 5$ seconds, as a compromise between possible feedback-instability and excessively long settling time. Thus, the function of the dilator 20 is such that the peak-to-peak amplitudes of the sawtooth output voltages $x'$ and $y'$ transmitted to the camera 18 through the rotator 21 and translator 22 will gradually increase or decrease as much as necessary to make the gyration radius of the image displayed on the monitor 24 commensurate with the preset voltage $b$. For example, if the optical input image 23 is an oversized white circular disk centered over a black background, the rectangular scanning window in the camera 18 will gradually expand, thereby causing the reproduced disk seen on the monitor 24 to contract until the ratio of the disk diameter to the mean-diameter of the monitor viewing screen is equal to 0.707 when $b = 2.5$ volts.

The rotator 21 in the video image normalizer of FIG. 5 has the specific function of making use of its control-signal input voltage $z$ to convert the two input deflection voltages $x'$ and $y'$ into two corresponding output deflection voltages $x''$ and $y''$ in accord with the relations $$x'' = x' \cdot \text{Cos}\,\theta + y' \cdot \text{Sin}\,\theta \quad (4)$$

$$Y'' = -x' \cdot \text{Sin}\,\theta + y' \cdot \text{Cos}\,\theta \quad (5)$$

in which the coordinate-rotation angle $\theta$ is rather slowly increased or decreased in accord with the differential equation $$d\theta/dt = \overline{\pi \cdot (x'' \cdot y'' \cdot z)} / (\tau' \cdot V_m^3) \quad (6)$$

In the latter expression the superbar denotes the running time-averaging function of a simple low-pass filter having typically an approximate bandwidth of $B =$ 5 Hz. The time constant $\tau'$ is typically chosen to have a value of $\tau' = 1.0$ second, as a compromise between possible feedback-instability and possible cross-modulation interference with the slower functions of the dilator 20. Thus, by means of the coordinate-rotating action of the rotator 21, and by means of the sawtooth output voltages $x''$ and $y''$ transmitted to the camera 18 through the translator 22, the rectangular scanning window in the window in the camera 18 will be gradually tilted clockwise or counterclockwise until the cross-product of inertia $\overline{(x'', y'' \cdot z)}$ is zero for both the camera-sensed image and the monitor-displayed image. For example, if the optical input image 23 is an almost-vertical white stripe which is somewhat tilted to produce predominant whiteness in the upper left and lower right quadrants, the cross-product of inertia $\overline{(x'' \cdot y a \cdot z)}$ will initially be negative, with the result that the camera scanning window will gradually rotate counter-clockwise until the white stripe is vertically aligned in the viewing screen of the monitor 24.

The translator 22 in the video image normalizer of FIG. 5 has the specific function of making use of its control-signal input voltage $z$ to convert the two input deflection voltages $x''$ and $y''$ into two corresponding output deflection voltages $x'''$ *and* $y'''$ in accordance with the relations $$x''' = x'' + p \quad (7)$$

$$y''' = y'' + q \quad (8)$$

in which the offset voltages $p$ and $q$ are rather slowly increased or decreased in accord with the differential equations $$dp/dt = \overline{(x'' \cdot z)} / (\tau'' \cdot V_m) \quad (9)$$

$$dq/dt = \overline{(y'' \cdot z)} / (\tau'' \cdot V_m) \quad (10)$$

In the latter expressions the superbar denotes the running time-averaging function of a simple low-pass filter having typically an approximate bandwidth of $B =$ 5Hz. The time constant $\tau''$ is typically chosen to have a value of $\tau'' = 0.2$ second, as a compromise between possible feedback instability and possible cross-modulation interference with the slower functions of the rotator 21. Thus, the function of the translator 22 is such that the horizontal and vertical offset voltages $p$ and $q$ will gradually increase or decrease as much as necessary to nullify the first moments $\overline{(x'' \cdot z)}$ and $\overline{(y'' \cdot z)}$ of the image displayed by the monitor 24. For example, if the optical input image 23 has predominant whiteness in its lower left quadrant, the whole rectangular scanning window in the camera 18 will be moved downward and leftward, thereby causing the reproduced image seen on the monitor 24 to be moved upward and rightward until its centroid is positioned at the center of the viewing screen.

Figure 6A:
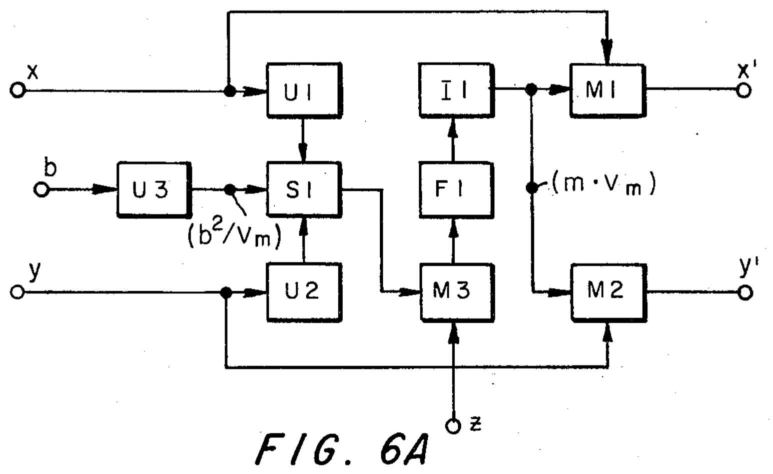
FIG. 6 shows the structures of the translation, rotation, and dilation subsystems of the video image normalizer of FIG. 5.
Figure 6B:
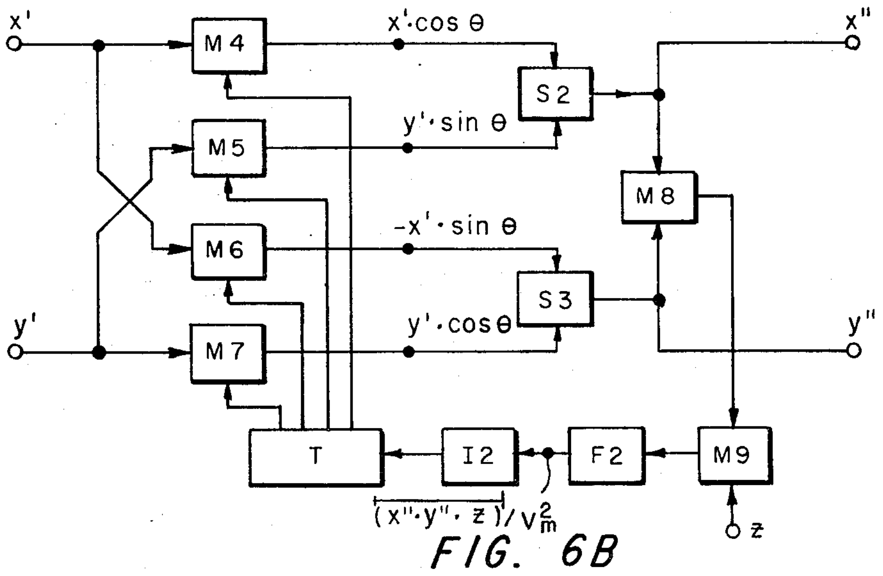
Figure 6C:
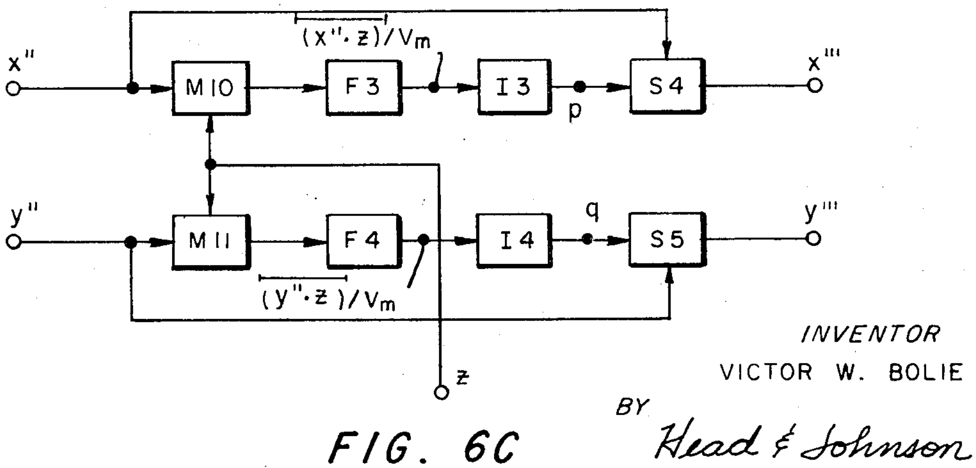

The detailed electronic structures of the dilator 20, rotator 21, and translator 22 of the video image normalizer shown in FIG. 5 are already apparent in the forms of the above discussed equations (1) through (10). More specifically, the circuits of FIGS. 6A, 6B, and 6C show, respectively, the structures of the dilator 20, the rotator 21, and the translator 22. The various individual components shown in the three circuits of FIG. 6 are commercially available items of standard design. For example, the component labelled as T in FIG. 6B is a solid-state trigonometric unit of a type like the Model R670 Sine-Cosine generator manufactured by Transmagnetics, Inc. of Flushing, N.Y., fitted with a sign-reversing unity-gain amplifier so that, with $\theta$ being defined as $\theta = \pi \cdot (E_1/V_m)$ and with $V_m$ having the typical value of $V_m = 10$ volts, it can produce the four output voltages $V_m \cdot \text{Cos}\,\theta$, $-V_m \cdot \text{Sin}\theta$, $+V_m \cdot \text{Sin}\,\theta$, and $-V_m \cdot \text{Cos}\,\theta$ in response to the input voltage $-V_m \leq E_1 \leq +V_m$. Similarly available from commercial sources such as the Burr-Brown Research Corporation of Tucson, Arizona are the analog voltage squaring units U1 through U3, the voltage summing devices S1 through S5, the analog voltage multipliers M1 through M11, the 5 Hz low-pass filters F1 through F4, and the analog voltage integrator I1 through I4.

With the several intermediate voltages labelled as shown, the three circuits of FIG. 6 are self-explanatory. For example, in FIG. 6A the output voltage of the 5 Hz low-pass filter F1 is readily deduced to be equal to $z\cdot(x^2+y^2-b^2)/V_m^2$, as is required by the above equation (3). Similarly, in FIG. 6B the output voltage of the multiplier M9 is easily seen to be equal to $(x''\cdot y''\cdot z)/V_m^2$ in order for it to be the signal-voltage input to the 5 Hz low-pass filter F2, as required by the above equation (6). Likewise, in FIG. 6C the output voltages $x'''$ and $y'''$ of the voltage summing devices S4 and S5 are readily deduced to be, respectively, equal to $(x''+p)$ and $(y''+q)$, as required by the above equations (7) and (8).

Finally, in regard to the three circuits of FIGS. 6, it will be seen that the four integrators I1 through I4 must have their beginning output voltages specified as initial conditions. Although other arrangements for the beginning values of these four voltages may be found useful in particular applications, a convenient set of initial conditions for the four integrators I1 through I4 is that resulting from a simple reset of I1 to the full-scale output voltage $V_m$ at the same time the integrators I2, I3, and I4 are reset to zero. By means of this set of initial conditions, the sweep-magnification factor m in the dilator 20 is initialized at $m = 1.0$, the coordinate rotation angle $\theta$ in the rotator 21 is initialized at $\theta = 0$, and the offset voltages $p$ and $q$ in the translator 22 are initialized at $p = 0$ volts and $q = 0$ volts. This set of initial conditions is also found to be convenient in the event that operation of the system of FIG. 5 as an ordinary television camera is desired, in which case the four integrators I1 through I4 are simply not released from their reset modes.

Figure 7:
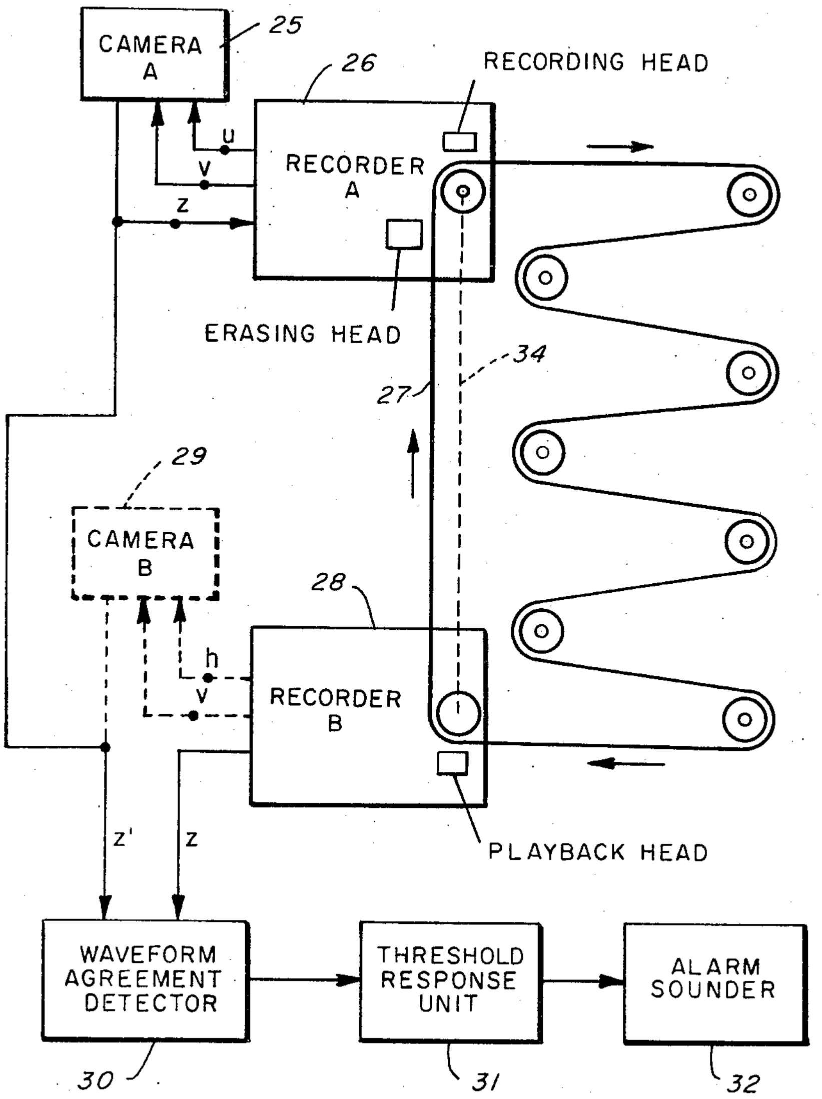
FIG. 7 illustrates in schematic form another embodiment of this invention related to an electronic change-of-scene detector utilizing a television camera and a pair of television tape recorders.

FIG. 7 shows a second embodiment of this invention, which comprises a change-of-scene detector. Like FIG. 1 it shows a television camera 25 viewing a scene, a television recorder in playback mode 28, a waveform agreement detector 30, a threshold response unit 31 and a data gate embodied as an alarm sounder 32, all of which are essentially similar to their counterparts in FIG. 1. The principal difference in these two embodiments is that in FIG. 1 the tape being read by the recorder in playback mode was made at another place and time by another recorder. In FIG. 7, the tape being read by recorder 28 is recorded a short time earlier by the same camera 25. The tape 27 is thus a short loop of magnetic tape, which travels out of the recording head of the first recorder 26, through an extended series of idler pulleys, into the playback head of the second recorder 28, and then back through an erase head to the recording head of recorder 26. This tape 27 records a scene from the camera 25, and at some short time interval later, the tape is read and the corresponding electronic signals are compared to those currently being produced by the camera. If the image field sensed by the camera has not changed during the delay interval, then the two sets of signals will be identical, and the threshold response unit 31 will produce an appreciable output voltage. This voltage will inhibit the operation of the alarm 32, which will sound whenever the two concurrent video signals $z'$ produced by the camera, and $z$ read from the tape (and produced by the camera at some time previously), are not in substantial agreement over a time span of at least one complete image scan. Since this condition will be encountered when and only when there is appreciable difference between the earlier scene sensed by the camera 25 and recorded on the tape loop 27, and the current scene sensed by the camera, the output voltage of the threshold response unit 31 is a measure of whether or not a significant change of scene has occurred. The alarm sounder 32, which may be a simple relay-operated bell, is connected to the output terminal of the threshold response unit 31 in such a way that the action of the alarm sounder 32 is inhibited by the output voltage of the threshold response unit 31.

The application of the change-of-scene detector system of FIG. 7 to problems such as that of all-night surveillance of streets and parking lots is obvious. It will also be seen that the system of FIG. 7 is self-updating in the sense that a given permanent change of scene will activate the alarm sounder 32 only during the time interval required for a complete revolution of the tape loop 27, after which the new scene will be used as the basis of reference. The time difference between the earlier scene and the current scene can be changed by adjusting the length of the tape loop 27, with a typically useful time difference being approximately 60 seconds.

It will, of course, be obvious that a second camera can be used to provide the video signals representative of the current scene. This would be useful if the object of the application of this apparatus were to compare the appearance of a moving object at two displaced positions. Then one camera, 26 would be used to record the tape signals, and a second camera 29, shown dashed, would be used at the second location to provide the video signals of the current scene.

In this invention, the waveform agreement detector makes a comparison of the two video signals $z'$ and $z$ (indicative of the current scene and the recorded scene) at each interval of time. It will be obvious that the two sweeps $h$ and $v$ of the camera and the recorder must be synchronized in order for the comparison of $z'$ and $z$ to be meaningful. This is accomplished in FIG. 1, for example, by using the sweep signals $h$, $v$, generated in the recorder to provide synchronized sweep signals in the camera.

In FIG. 7 the system is different in that there are now two recorders 26, 28 whose sweeps $h$ and $v$ must be synchronized. This requires either that (1) the read and write heads be provided on a single recorder, (which could be displaced in time along the tape), or (2) that a mechanical means be used to tie together the rotating head assemblies so that they will run in synchronism. Such a tie means is indicated by the dashed line 34 between the head systems of the two recorders.

While the invention has been described with a certain degree of particularity, it is manifest that many changes may be made in the details of construction and the arrangement of components. It is understood that the invention is not to be limited to the specified embodiments set forth herein by way of exemplifying the invention, but the invention is to be limited only by the scope of the attached claim or claims, including the full range of equivalency to which each element or step thereof is entitled.

What is claimed:

1. A video image recognition system, comprising:

a. electronic image scanning means;

b. electronic image storage and playback means comprising a strip of video tape with a plurality of different electronic images recorded thereon, each of said plurality of images identified by a different index, and means responsive to said waveform agreement detector means to display the index of the image on said tape;

c. means to synchronize the sweep signals of said scanning and playback means;

d. waveform agreement detector means responsive to said scanning and playback means; and e. means to utilize the output of said waveform agreement detector means.

2. The system as in claim 1 wherein said means to utilize the output of said waveform agreement detector means comprises threshold response means comprising means to produce a non-zero output voltage if the output voltage of said waveform agreement detector means rises above a pre-set threshold level.

3. The system as in claim 1 including video image normalizer means associated with said electronic image scanning means for adjusting the size, position and angle of the image to preselected conditions.

4. The system as in claim 1 including means for recording said index for each image recorded on said tape, in the form of a multibit audiotone record on said tape, and including audiotone decoder means and multibit gate means responsive to said waveform agreement detector means.

5. The system as in claim 1 wherein said waveform agreement detector means comprises:

a. amplifier means to amplify the difference in voltages of the video signals provided by said image scanning means and said image playback means to provide a difference signal;

b. means to obtain the absolute magnitude of said difference signal; and c. low-pass filter means to accumulate the average of said absolute magnitude over a time interval spanning at least one complete image scan.

6. The system as in claim 1 wherein said image scanning means comprises a television camera, said storage and playback means comprises a television recorder and tape, the sweep circuits of said camera responsive to the sweep signals of said recorder, the video intensity signals generated by said camera and said recorder delivered to said waveform agreement detector.

7. The system as in clam 6 wherein said waveform agreement detector comprises means to continuously compare the video intensity signals derived from said camera and said recorder and to provide a substantial voltage output if said two video intensity signals are in substantial agreement over a time interval equivalent to at least one complete image scan.

8. The system as in claim 1 including a recording and storage means synchronized with said storage and playback means, with common storage means, said common storage means comprising loop tape means, on which video image signals are recorded at said recording means, and from which said video image signals are played back by said playback means.

9. The system as in claim 8 including means to indicate when the video image signals from said camera and said tape are not in essential agreement for a period corresponding to one scan of said images.

10. The system as in claim 1 including centripetal enhancement means associated with said waveform agreement detector means for enhancing the sensitivity of said detector means for different diametral areas of the image.

11. The system as in claim 10 in which said centripetal enhancement means comprises:

a. horizontal and vertical sweep generator means providing voltages corresponding respectively to $x$ and $y$;

b. parabolic units responsive respectively to voltages $x$ and $y$ to produce voltages corresponding to $(1-x^2 1-y^2)$ respectively;

c. first analog multiplier means to provide an output corresponding to $m = (1-x^2)(1-y^2)$ where $m$ is a multiplication coefficient; and d. second analog multiplier means responsive to said first multiplier means to provide a voltage output corresponding to the product $me'$, where $e'$ is the said absolute magnitude signal.

12. The system as in claim 1 including dilator means to adjust the mean diameter of the video image generated by said system.

13. The system as in claim 12 including rotator means.

14. The system as in claim 13 including translator means.

* * * * *